Patented Mar. 18, 1947

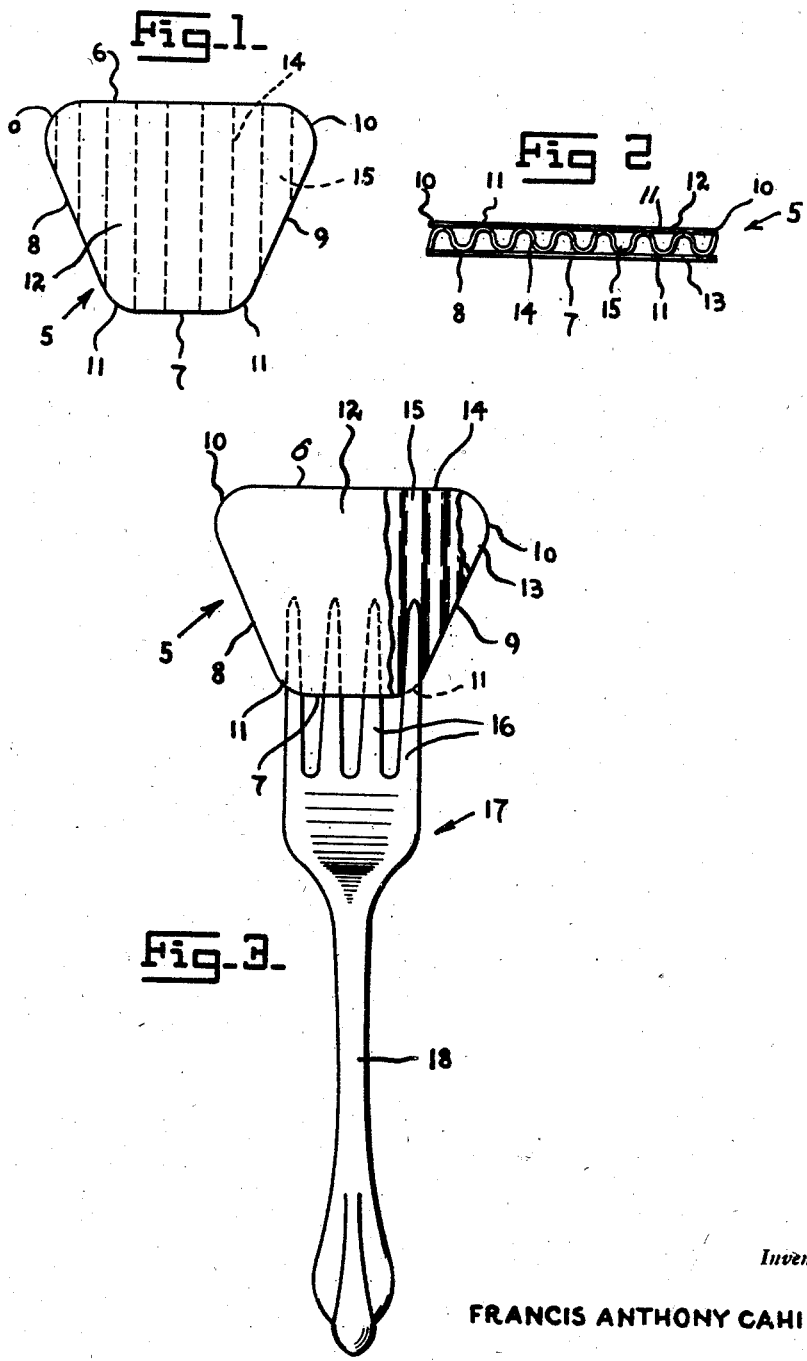

2,417,585

UNITED STATES PATENT OFFICE 2,417,585

UTENSIL AND PLATE SCRAPER

Francis Anthony Cahill, Cleveland, Ohio

Application November 3, 1945, Serial No. 626,516

1 Claim. (Cl. 15—236)

The present invention relates to small hand-type accessories and appliances such as are used, primarily in the kitchen of the home, for scraping and partially cleaning temporarily soiled dishes, pots, pans and utensils in general.

More specifically, the invention relates to that particularized category of such accessories which may be best described as scraping and cleaning devices, particularly such devices as are shown, for example, in the patents to S. B. Clift, No. 2,065,886 and W. Meredith, 1,388,282.

In carrying out the principles of the present invention, I have in mind a simple and economical scraper and cleaner which is possessed of appreciable structural distinctions and refinements, the article, in its preferred form, being made from cardboard or equivalent stock and being disposable so that it may be readily and conveniently thrown away when its essential purposes have been served.

Stated in greater particularity, in carrying out the principles of this invention, I have evolved and produced a simple and expedient disposable scraper made from three plies of cardboard or equivalent stock, these being fastened together in superposed relation with the intermediate ply corrugated to provide pockets, and said pockets serving as receivers or sockets for fork tines, thus permitting the tines of the fork to be removably inserted in the sockets and allowing the fork thus to become a handle for conveniently handling the scraper and cleaner.

Other objects, features, and advantages will become more readily apparent from the following description and the accompanying illustrative drawings.

In the drawings, wherein like numerals are employed to designate like parts throughout the views:

Figure 1 is a top plan view of a plate, cooking vessel, or utensil cleaning and scraping device constructed in accordance with the principles of this invention.

Figure 2 is a marginal edge or elevational view observing the narrower or smaller end of the device in Figure 1.

Figure 3 is a top plan view, similar to Figure 1, but with one end portion of the upper ply broken away to expose the intermediate, corrugated ply and this view showing how the device is mounted on the tines of a conventional fork.

As before stated, the device is a simple unitary structure which is susceptible of use without a handle but which is primarily adapted to be used in connection with a handle, preferably with the handle of a conventional fork, as shown in Figure 3 of the drawing. Although the device is susceptible of construction from many different types and kinds of disposable materials, I have found that cardboard stock can be employed so long as it is sufficiently stiff to give the degree of rigidity needed for scraping and cleaning purposes. In top plan view, the device, which is denoted generally by the numeral 5, resembles a trapezium in shape. The parallel, spaced ends are differentiated by the numerals 6 and 7, the end 7 being somewhat shorter than the end 6. The intervening end-edges 8 and 9 are oblique to the ends 6 and 7 and may be said to converge toward the end 7. The connective corner portions are somewhat rounded, as indicated at the points 10—10 and 11—11. This covers the general shape and appearance and nature of the device 5.

Breaking the device down into its parts, it comprises upper and lower superimposed and spaced plies of cardboard, the upper ply being denoted at 12 and the lower ply at 13. The intervening or third ply is, of course, interposed between the two plies 12 and 13 and it is corrugated, the corrugations being denoted as at 14. These corrugations define alternate "hill and dale" waves and the "dales" 15 constitute receptacles or sockets for reception of the tines 16 of the conventional fork 17. Thus, the handle 18 of the fork serves as a handle for the scraper and cleaner, as is evident.

As has beeen previously explained, the device 5 is susceptible of use alone, that is, without any special handle attached thereto. For example, it can be used along the same lines as the somewhat similarly constructed scraper and cleaner illustrated in the aforementioned Meredith Patent 1,388,282. And, by the same token, the handle of the fork can be applied thereto by securing the tines in place in the receptacles 15 as shown in Figure 3, whereupon the device can be employed somewhat along the lines of that covered in the utensil cleaner of Clift, 2,065,866. I desire that the description and drawings be interpreted to cover both versions.

So far as I have been able to ascertain, and it is evident that I am generally conversant with the state of the art to which the invention relates, I am not familiar with any similar trapezoidal-shaped, disposable cleaner with rounded corners, and triple-ply construction which is usable as shown in Figure 1, or usable alternatively as shown in Figure 3.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

I claim:

A scraper and cleaner for plates, vessels, pots, pans and the like comprising a body of general trapezoidal form in top plan view, said body being substantially rectangular in cross sectional form and composed of spaced parallel upper and lower cardboard plies and an intervening cardboard ply, said intervening ply being corrugated and the corrugations being arranged to form open ended pockets, said pockets opening through opposite edge portions of said body and serving to accommodate the tines of a regular table fork, and a standard type table fork comprising a handle and a fork head, the fork head including tines and said tines fitting into corresponding chosen open ends of said pockets, whereby to detachably mount the body on the fork head and, in so doing, to permit the fork to be conveniently employed as a handle for manipulating said body.

FRANCIS ANTHONY CAHILL.

REFERENCES CITED

The following references are of record in the file of this patent:

UNITED STATES PATENTS

| Number | Name | Date |
|---|---|---|
| 2,262,316 | Brugman | Nov. 11, 1941 |
| 1,581,943 | Bunker | Apr. 20, 1926 |
| 1,541,088 | Whitenack | June 9, 1925 |
| 918,964 | Chapin | Apr. 20, 1909 |
| 1,973,093 | Moore | Sept. 11, 1934 |